United States Patent Office 3,737,420
Patented June 5, 1973

---

3,737,420
ANTISTATIC ACRYLONITRILE POLYMERS
Dieter Brokmeier, Dormagen, Helmut Englehard, Leverkusen, Francis Bentz, Cologne, and Armin Kohler and Gunther Nischk, Dormagen, Germany, assignors to Farbenfabriken Bayer Aktiengesellschaft, Leverkusen, Germany
No Drawing. Filed Sept. 3, 1971, Ser. No. 177,826
Claims priority, application Germany, Sept. 3, 1970,
P 20 43 647.9
Int. Cl. C08f *3/76, 15/22, 45/58*
U.S. Cl. 260—85.5 R          17 Claims

ABSTRACT OF THE DISCLOSURE

The invention relates to acrylonitrile polymer compositions comprising from 1 to 20% by weight, based on total composition, of one or more antistatic compounds having the general formula

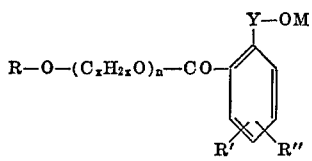

in which R represents a $C_1$ to $C_{30}$-alkyl, cycloalkyl, $C_3$ to $C_{30}$-alkenyl, aryl, polyaryl, alkylaryl, arylalkyl group and a group having the formula

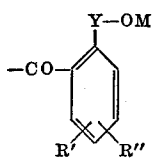

R' and R" each represent hydrogen, a $C_1$ to $C_4$ alkyl group and halogen,
$x$ represents a number from 1 to 4,
$n$ represents 0 or a number from 1 to 100,
Y represents an $SO_2$ or CO group, and
M represents a hydrogen or alkali metal atom.

---

This invention relates to antistatic acrylonitrile polymers.

Shaped structures of polymers, especially fibres of copolymers predominantly containing acrylonitrile, usually have the unfavourable property of developing an electrical charge, which seriously restricts their range of potential commercial applications. A troublesome electrical charge of the kind in question always occurs when the fibres have a surface resistance of greater than $10^{12}$ ohms.

For this reason, there have been many attempts to modify polyacrylonitrile fibres by applying or incorporating antistatic preparations to them or in them to reduce their electrical surface resistance to a level which will prevent prolonged electrical charging.

For example, Belgian patent specification No. 716,801 describes mixtures of polyacrylonitrile fibres with 1 to 10% by weight of electrically conductive synthetic fibres whose conductivity is provided by a firmly adhering metal coating of nickel or copper.

According to Chim. Volokna 10 (1968), pages 54–57, polyacrylonitrile filaments are treated in a "freshly precipitated" i.e. still highly porous state with ethylene glycol vapour and are subsequently subjected to thermal stretching at 150° C., resulting, by elimination of water and cross-linking, in the formation on the surface of a polyether which contributes towards reducing the surface charge.

United States patent specification No. 3,376,245 describes the treatment of a polyacrylonitrile fiber with polyepoxides which are subsequently hardened with polyethers containing terminal amino groups.

According to British patent specification No. 1,118,877 the surface resistance of polyacrylonitrile filaments can be reduced by treating the filaments with a solution of copolymers of acrylonitrile and polyethers terminally substituted by vinyl groups having a molecular weight of 200 to 6000, followed by drying.

One feature common to all these methods is that they involve a complicated treatment of the fibres. In addition, the properties of the fibres are modified to a considerable extent, which is not always desirable.

Accordingly, it is one object of this invention to provide a process by which it is possible to produce fibres from polyacrylonitrile or from copolymers of acrylonitrile and other copolymerisable compounds without any need for the fibres to be aftertreated.

This object is accomplished by a process for the production of antistatic filaments or films from an acrylonitrile polymer which comprises spinning or casting a solution comprising an acrylonitrile polymer and from 1 to 20% by weight, based on the total solids content, of one or more antistatic compounds having the general formula

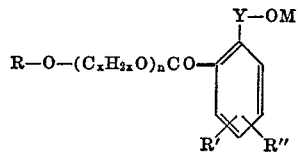

in which R represents hydrogen or a member selected from the group consisting of a $C_1$ to $C_{30}$-alkyl, cycloalkyl, $C_3$ to $C_{30}$-alkenyl, aryl, polyaryl, alkylaryl, arylalkyl group having the formula

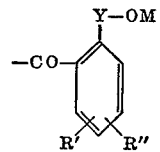

R' and R" each represent a member selected from the group consisting of hydrogen, a $C_1$ to $C_4$-alkyl group and halogen,
$x$ represents a number from 1 to 4,
$n$ represents a number from 0 to 100,
Y represents an $SO_2$ or CO group, and
M represents a hydrogen or alkali metal atom.

Moreover, the invention relates to acrylonitrile polymer compositions comprising from 1 to 20% by weight, based on total composition, of one or more antistatic compounds having the general formula

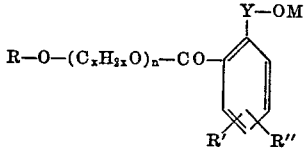

wherein R, R', R", M, Y, $x$ and $n$ have the meanings given above.

The acrylonitrile polymers according to the invention are obtained, preferably in the form of filaments, by mixing spinnable solutions of acrylonitrile polymers with from 1 to 20% by weight, based on the total solids content, of compounds having the general formula

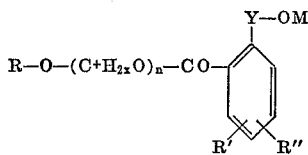

wherein R, R', R", M, Y, $x$ and $n$ have the meanings given above, and spinning the resulting mixed solution.

The compounds to be added to the polymer solutions in accordance with the invention can readily be obtained without any need for expensive apparatus from water, alcohols or phenols, for example methanol, ethanol, amyl alcohol, stearyl alcohol, allyl alcohol, oleyl alcohol, cyclohexyl alcohol, phenol, naphthol, phenylphenol, cresol, nonylphenol, benzyl alcohol and reaction products of phenol with styrene or p-methyl styrene by catalytically reacting the alcoholic or phenolic OH-groups with an epoxide, for example, ethylene oxide, propylene oxide and butylene oxide, to form a compound having the general formula

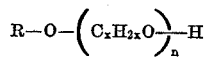

in which R and $n$ have the meanings given above, followed by reaction with a compound having the general formula

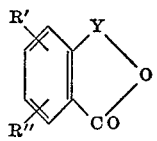

in which Y represents a CO or $SO_2$ group whilst R' and R" have the meanings given above, at a temperature of from 0 to 150° C. The acid formed during the reaction can optionally be subsequently neutralised with an alkali base.

It is of course also possible to employ mixtures of the compounds added in accordance with the invention, the term "mixtures" relating to the alcohols used for alkoxylation.

Since the alkylene oxide in question is incorporated statistically rather than uniformly during production of the compounds, the index "$n$" in the formula indicates the average degree of polyaddition of alkylene glycol chains of different length.

In addition, it is possible for a mixture of two or of the three above-mentioned alkylene oxides rather than a single alkylene oxide to be reacted with the selected alcohols. Moreover, alkoxylation can also be carried out stepwise using different alkylene oxides.

Both the alkoxylation products of alcohols, and also the reaction products of the polyaddition compounds with the anhydrides of the formula

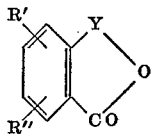

are miscible with solutions of acrylonitrile polymers consisting predominantly of acrylonitrile without precipitation of the polymers from the solution, so that the mixtures can readily be spun into filaments. The filaments obtained have, in both instances, a distinctly reduced electrical surface resistance.

Acrylonitrile polymers suitable for the purposes of the invention include, in addition to pure polyacrylonitrile, copolymers containing preferably at least 70% by weight of polymerised acrylonitrile and up to 30% by weight of other copolymerisable compounds from the group of vinyl, vinylidene and (meth) acrylic compounds in copolymerised form.

The following are examples of copolymerisable compounds: neutral, acidic or basic (meth)acrylic esters, like alkyl-, sulfoalkyl, aminoalkyl esters, (meth)acrylic amides, vinyl chloride, vinylidene chloride and copolymerisable compounds which produce an improvement in affinity for acid or basic dyes.

Suitable solvent include any solvent that can be used for polyacrylonitrile, especially dimethyl formamide.

Whereas fibres of copolymers consisting predominantly of acrylonitrile have a surface resistance of at least $10^{13}$ ohms, fibres containing 1 to 20% by weight, and preferably 5 to 10% by weight, of compounds having the above-mentioned general formula, used in accordance with the invention, have a surface resistance of only $10^8$ to $10^{11}$ ohms, which is entirely adequate for practical purposes.

It is a considerable advantage that fibres containing the compounds used according to the invention do not undergo any change in their surface resistance, even after repeated washing with alkaline detergents, whilst fibres which only contain polyalkoxy alcohols and which have an initial surface resistance of $10^8$ to $10^{11}$ ohms, show a surface resistance equivalent to that of a non-modified fibre after only one wash.

The compounds used in accordance with the invention are not only compatible with the described polymers and copolymers, they also allow the addition of stabilisers, fillers, dyes, pigments and anti-oxidants without any adverse effect upon the anti-electrostatic effect attributable to these additives.

In addition to their outstanding anti-static properties, the acrylonitrile polymers according to the invention are also distinguished by a high affinity for basic dyes and by considerably improved water absorption.

PRODUCTION OF THE ADDITIVES USED IN ACCORDANCE WITH THE INVENTION (A) 60 parts by weight of benzoic acid/sulphonic acid endoanhydride are added in portions with stirring at 60° C. to 513 parts by weight (0.33 mol) of an emulsifier of isononyl phenol and ethylene oxide (OH number 36). After the exothermic reaction has abated, the reaction mixture is stirred for 2 hours at 60° C. and then left to cool. The viscous pale yellow liquid which gradually solidifies on cooling does not show any more "anhydride bands" in its infra-red spectrum.

*Analysis.*—Calculated (percent): C, 57.1; H, 8.6; O, 32.4; S, 1.9. Found (percent): C, 57.3; H, 8.8; O, 31.9; S, 5.6.

The following examples are to further illustrate the invention without limiting it.

Example 1

5 parts by weight of the sulphonic acid according to A are dissolved together with 95 parts by weight of polyacrylonitrile (K-value 82) in DMF to form a 27% by weight solution which is dry-spun into filaments, stretched and conditioned.

The surface resistance of the fibres (measured at 23° C./50% relative humidity) amounts to $9.10^9$ ohms and only rises to $3.10^{10}$ ohms after ten washes in a washing liquid of a standard detergent at 60° C.

Example 2

10 parts by weight of the sulphonic acid according to A, together with 90 parts by weight of a copolymer of 95 parts by weight of acrylonitrile and 5 parts by weight of methylacrylate (K-value 82), are dissolved in DMF to form a 27% by weight solution which is dry spun into filaments. Stretched and conditioned fibres initially have a surface resistance of $4.10^9$ ohms, and of $8.10^9$ ohms after 10 washes with a standard detergent.

Comparison example.—Fibres of 10 parts by weight of iso-nonylphenoxypolyalkoxy ethanol (OH-number 36) and 90 parts by weight of polyacrylonitrile (K-value 82), produced as in Example 1, have an initial surface resistance of $5.10^{11}$ ohms, and a resistance of $2.10^{13}$ ohms after one wash with the same detergent as in Example 1.

Example 3

484 parts by weight of iso-nonylphenoxypolyethoxy ethanol (OH number 116) are reacted as in A with 184 parts by weight of benzoic acid/sulphonic acid endohydride.

The product thus obtained shows the following analysis:

*Analysis.*—Calculated (percent): C, 60.5; H, 7.7; O, 26.4; S, 6.5. Found (percent): C, 61.1; H, 7.9; O, 25.8; S, 6.8.

Fibres of 92.5% by weight of a copolymer containing 95% by weight of acrylonitrile and 5% by weight of methyl acrylate (K-value 82) and 7.5% by weight of this sulphonic acid initially have a surface resistance of $8.10^9$ ohms, and one of $3.10^{10}$ ohms after ten washes with a standard detergent.

In Examples 5 to 13, the additives were each prepared as in A unless otherwise stated.

The products thus obtained were processed into fibres with polyacrylonitrile as described in Example 1.

The surface resistances of the fibres thus obtained are set out in Table I.

Example 4

384 parts by weight of an emulsifier prepared from oleyl alcohol and ethylene oxide (OH number 49) are reacted with 61 part by weight of benzoic acid/sulphonic acid endohydride.

Example 5

379 parts by weight of an emulsifier prepared from a mixture of cetyl alcohol and stearyl alcohol and stearyl alcohol and ethylene oxide (OH number 50) are reacted with 60 parts by weight of benzoic acid/sulphonic acid endohydride.

Example 6

320 parts by weight of an emulsifier prepared from the reaction product of 3 mols of p-methyl styrene and phenol with ethylene oxide (OH number 35) are reacted with 36 parts by weight of benzoic acid/sulphonic acid endoanhydride.

Example 7

513 parts by weight of an emulsifier of iso-nonylphenol and ethylene oxide (OH number 36) are heated with stirring for 3 hours at 115° C. in a nitrogen atmosphere with 49 parts by weight of phthalic acid anhydride. At the end of this period, the absence of the anhydride band in the infra-red spectrum indicates a complete reaction.

Example 8

384 parts by weight of an emulsifier prepared from oleyl alcohol and ethylene oxide (OH number 49) are reacted as in Example 7 with 49 parts by weight of phthalic acid anhydride.

Example 9

272 parts by weight of an emulsifier prepared from stearyl alcohol and ethylene oxide (OH number 105) are reacted as in Example 7 with 74 parts by weight of phthalic acid anhydride.

Example 10

320 parts by weight of an emulsifier prepared from the reaction product of p-methyl styrene and phenol with ethylene oxide (OH number 35) are reacted as in Example 7 with 30 parts by weight of phthalic acid anhydride.

Example 11

250 parts by weight of polyethylene glycol (OH number 110) are reacted with 92 parts by weight of benzoic acid/sulphonic acid endohydride.

Example 12

500 parts by weight of polyethylene glycol (OH number 57) are reacted as in Example 7 with 30 parts by weight of phthalic acid anhydride.

TABLE I.—SURFACE RESISTANCE (23° C./50% RELATIVE HUMIDITY)

| Example | Percent by weight of additive | Ohms After stretching | After 5 washes* | After 10 washes* |
|---|---|---|---|---|
| 5 | 7.5 | $9.10^9$ | $2.10^{10}$ | $4.10^{10}$ |
| 6 | 5 | $10^{10}$ | $4.10^{10}$ | $5.10^{10}$ |
| 7 | 5 | $5.10^9$ | $7.10^9$ | $9.10^9$ |
| 7 | 10 | $8.10^8$ | $3.10^9$ | $3.10^9$ |
| 8 | 10 | $7.10^9$ | $2.10^{10}$ | $2.10^{10}$ |
| 9 | 7.5 | $2.10^{10}$ | $3.10^{10}$ | $3.10^{10}$ |
| 10 | 10 | $4.10^{10}$ | $5.10^{10}$ | $7.10^{10}$ |
| 11 | 5 | $9.10^9$ | $2.10^{10}$ | $2.10^{10}$ |
| 11 | 10 | $5.10^9$ | $7.10^9$ | $10^{10}$ |
| 12 | 5 | $5.10^8$ | $7.10^9$ | $2.10^{11}$ |
| 13 | 5 | $3.10^9$ | $10^{10}$ | $6.10^{11}$ |

*With a standard detergent.

What we claim is:

1. An acrylonitrile polymer composition which comprises from 1 to 20% by weight, based on total composition, of one or more antistatic compounds having the general formula

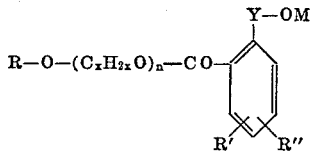

in which

R represents hydrogen or a member selected from the group consisting of $C_1$ to $C_{30}$-alkyl, cycloalkyl, $C_3$ to $C_{30}$-alkenyl, aryl, polyaryl, alkylaryl, arylalkyl group, and a group having the formula

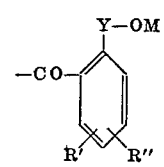

R' and R'' each represent a member selected from the group consisting of hydrogen, a $C_1$ to $C_4$-alkyl group and halogen, $x$ represents a number from 1 to 4, $n$ represents a number from 1 to 100, Y represents an $SO_2$ or CO group, and M represents a hydrogen or alkali metal atom.

2. An acrylonitrile polymer composition as claimed in claim 1, wherein the acrylonitrile polymer is a copolymer of at least 70% by weight of acrylonitrile and up to 30% by weight of one or more copolymerisable monomers selected from the group consisting of a vinyl, vinylidene, acrylic and methacrylic monomer.

3. An acrylonitrile copolymer composition as claimed in claim 2, wherein the comonomer is an alkyl ester of acrylic acid.

4. An acrylonitrile polymer composition as claimed in claim 1, which comprises from 5 to 10% by weight, based on total composition, of the antistatic agent.

5. A process for the production of antistatically finished filaments or films from an acrylonitrile polymer which comprises spinning or casting a solution comprising an acrylonitrile polymer and from 1 to 20% by weight, based on the total solids content, of one or more antistatic compounds having the general formula

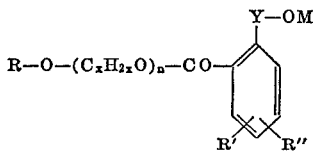

wherein R, R', R", M, Y, $x$ and $n$ have the meanings given in claim 1.

6. A process as claimed in claim 5, wherein the acrylonitrile polymer is a copolymer of at least 70% by weight of acrylonitrile and up to 30% by weight of one or more copolymerisable polymers selected from the group consisting of a vinyl, vinylidene, acrylic and methacrylic comonomer.

7. A process as claimed in claim 6, wherein the comonomer is an alkyl ester of acrylic acid.

8. The acrylonitrile polymer composition as claimed in claim 1, wherein R represents a member other than hydrogen.

9. An acrylonitrile polymer composition as claimed in claim 1, wherein R is $C_1$ to $C_{30}$-alkyl, cyclohexyl, phenyl, naphthyl, phenyl-phenyl, tolyl, nonylphenyl, benzyl, or $C_3$ to $C_{30}$-alkenyl.

10. An acrylonitrile polymer composition as claimed in claim 1, wherein R' and R" are hydrogen and Y is $SO_2$.

11. An acrylonitrile polymer composition as claimed in claim 1, wherein R' and R" are hydrogen and Y is CO.

12. An acrylonitrile polymer composition as claimed in claim 1, wherein R is nonylphenyl.

13. An acrylonitrile polymer composition as claimed in claim 1, wherein R is oleyl.

14. An acrylonitrile polymer composition as claimed in claim 1, in which R is stearyl.

15. An acrylonitrile polymer composition as claimed in claim 1, in which R is hydrogen.

16. An acrylonitrile polymer composition as claimed in claim 1, wherein $x$ is a number from 2 to 4.

17. An acrylonitrile polymer composition as claimed in claim 1, wherein $x$ is 2.

References Cited
UNITED STATES PATENTS

| | | | |
|---|---|---|---|
| 2,170,949 | 8/1939 | Morgan | 260—45.85 T |
| 3,644,310 | 2/1972 | Hopkins | 260—85.5 R |

OTHER REFERENCES

Lang et al., Chem. Abs., 60 (1964), p. 13380a.

HARRY WONG, JR., Primary Examiner

U.S. Cl. X.R.

117—138.8, 161; 260—32.6 N, 45.85 H, 45.85 T, 45.85 P, 45.85 S, 45.85 V, 79.3 M, 80.81, 88.7 D, 88.7 N, Digest 15